United States Patent Office 2,933,508
Patented Apr. 19, 1960

2,933,508

ANTHRAQUINONE DERIVATIVES

Frank Lodge, Blackley, Manchester, England, assignor to Imperial Chemical Industries Limited, a corporation of Great Britain No Drawing. Application December 12, 1952
Serial No. 325,695

Claims priority, application Great Britain December 21, 1951

7 Claims. (Cl. 260—380)

This invention relates to the manufacture of new anthraquinone derivatives and more particularly it relates to anthraquinone dyestuffs useful for dyeing cellulose acetate rayon.

According to my invention I provide new anthraquinone derivatives of the general formula:

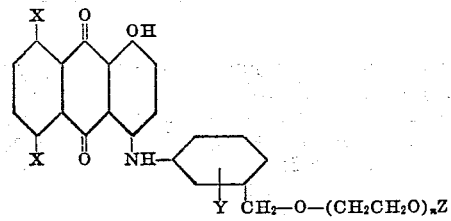

where X stands for a hydroxy or nitro group, Y stands for methyl or hydrogen, Z stands for hydrogen or an alkyl radical and $n$ stands for one, two or three.

According to a further feature of my invention I provide a process for the manufacture of the said dyestuffs which comprises reacting a 1-hydroxy-4-nitro-anthraquinone containing nitro or hydroxyl groups in the 5 and 8 positions, with a primary arylamine of the formula:

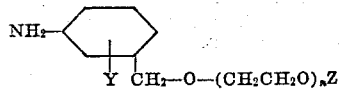

wherein Y, Z and $n$ have the meaning stated above.

As suitable 1-hydroxy-4-nitro-anthraquinones for use in the process of this invention there may be mentioned for example 1:5 - dihydroxy-4:8-dinitroanthraquinone, 1:5:8-trihydroxy-4-nitro-anthraquinone and 1:8-dihydroxy-4:5-dinitro-anthraquinone.

Suitable primary amines which may be used in the process of the invention include for example m-aminobenzyl β-hydroxyethyl ether, m-aminobenzyl β-(β'-hydroxyethoxy)-ethyl ether, 5-amino-2-methylbenzyl β-(β'-hydroxyethoxy)-ethyl ether, m-aminobenzyl β-(β'-hydroxyethoxyethoxy)-ethyl ether, m-aminobenzyl β-hydroxypropyl ether, m-aminobenzyl gamma-hydroxypropyl ether and m-aminobenzyl β-methoxyethyl ether.

The reaction between the substituted anthraquinone and the primary arylamine may be conveniently brought about by heating the reactants together, the amine being conveniently in excess and the reaction temperature being preferably between 100° C.–130° C. The reaction may also be carried out in the presence of an organic solvent such as for example β-ethoxyethanol.

The new anthraquinone dyestuffs of this invention have very good affinity for acetate rayon to which they impart a blue colour which is fast to light and has a high resistance to the action of combustion products of coal gas. The new dyestuffs either singly or in the form of mixtures are also valuable for colouring polyester fibres.

The following examples, in which the parts are by weight, illustrate but do not limit the invention:

Example 1

10 parts of 1:8-dihydroxy-4:5-dinitroanthraquinone are stirred with 40 parts of m-aminobenzyl β-(β'-hydroxyethoxy)-ethyl ether and heated under a reflux condenser at 120° C. during 3 hours. The mixture is cooled to 50° C. and poured into a mixture of 400 parts of ethanol and 100 parts of water. The mixture is allowed to stand for 2 hours and it is then filtered and the solid residue on the filter is washed with 70% ethanol. The product is a new dyestuff which in aqueous dispersion colours acetate rayon in strong, attractive blue shades possessing very good fastness to burnt-gas fumes and to light.

Example 2

5 parts of 1:5-dihydroxy-4:8-dinitroanthraquinone are mixed with 20 parts of m-aminobenzyl β-hydroxyethyl ether. The mixture is stirred and heated under a reflux condenser at 120° C. during 2 hours. The product is isolated as described in Example 1. The product is a new dyestuff which in aqueous dispersion colours acetate rayon giving strong blue shades of very good fastness to light and burnt-gas fumes.

Example 3

10 parts of 1:8-dihydroxy-4:5-dinitro-anthraquinone, 30 parts of β-ethoxyethanol and 10 parts of m-aminobenzyl β-(β'-hydroxyethoxy)-ethyl ether are stirred together under a reflux condenser at 130° C.–135° C. for 18 hours. The mixture is cooled to 80° C., 30 parts of ethanol are added and the mixture is filtered to remove unchanged starting material. The blue solution so obtained is diluted with 90 parts of ethanol and 100 parts of water are then added slowly to precipitate the product. The mixture is allowed to stand for 2 hours and the dyestuff is then filtered off and washed with a mixture of equal parts of ethanol and water. When dispersed in water, the new product dyes acetate rayon in strong, attractive blue shades possessing very good fastness to burnt-gas fumes and to light.

A blue dyestuff of similar properties is obtained by replacing the 10 parts of m-aminobenzyl β-(β'-hydroxyethoxy)-ethyl ether used in the above example by 10 parts of m-aminobenzyl β-(β'-hydroxyethoxyethoxy)-ethyl ether.

Example 4

5 parts of 1:5:8-trihydroxy-4-nitroanthraquinone, 10 parts of β-ethoxyethanol and 5 parts of m-aminobenzyl β-(β'-hydroxyethoxy)-ethyl ether are stirred together at 170–175° for 18 hours. The mixture is cooled and diluted with ethanol and the precipitated dyestuff is filtered off and washed with ethanol. When dispersed in water the new product dyes acetate rayon in reddish blue shades of very good fastness to burnt-gas fumes and to light.

Example 5

20 parts of 1:8-dihydroxy-4:5-dinitroanthraquinone, 40 parts of m-aminobenzyl β-hydroxypropyl ether and 40 parts of phenol are stirred together at 125° C. for 16 hours. The deep blue solution is cooled and diluted with 200 parts of β-ethoxyethanol and 380 parts of ethanol. 120 parts of water are then added. The mixture is allowed to stand and the new dyestuff which crystallizes out, is filtered off, washed with 70% ethanol and dried. When dispersed in water the product yields deep blue dyeings on acetate rayon possessing very good fastness to burnt-gas fumes and to light.

Example 6

In place of the 20 parts of 1:8-dihydroxy-4:5-dinitro-anthraquinone used in Example 5 there are used 20 parts of 1:5-dihydroxy-4:8-dinitro-anthraquinone. The product gives blue shades on acetate of similar properties to those obtained with the dyestuffs of Example 5.

*Example 7*

10 parts of the dyestuff of Example 5 and 10 parts of the dyestuff of Example 6 are mixed together and added gradually, to 200 parts of 70% sulphuric acid which is stirred at 10–15° C. The mixture is stirred for half an hour and then poured on to 1,000 parts of a mixture of ice and water. The precipitated dyestuff is filtered off, washed acid-free with water and milled to give a fine dispersion. The affinity of the product for acetate rayon is very good and bright, deep-blue shades are obtained possessing very good fastness to burnt-gas fumes and to light. The product is valuable for use in colouring polyethylene terephthalate textile materials.

*Example 8*

6 parts of 1:8-dihydroxy-4:5-dinitro-anthraquinone, 12 parts of phenol and 12 parts of m-aminobenzyl gamma-hydroxypropyl ether are stirred together at 125° C. for 18 hours. 60 parts of β-ethoxyethanol are added and the blue solution so obtained is cooled to 80° C. The dyestuff is precipitated by adding 80 parts of ethanol and then 50 parts of water to the solution. The mixture is allowed to stand at 20° C. for 2 hours and the dyestuff is filtered off, washed with ethanol and milled to form a dispersed paste. The dyestuff dyes rayon in bright, deep-blue shades possessing very good fastness to burnt-gas fumes and to light.

*Example 9*

10 parts of 1:8-dihydroxy-4:5-dinitro-anthraquinone, 20 parts of phenol and 20 parts of m-aminobenzyl β-hydroxyethyl ether are stirred together at 125° C. for 18 hours. The mixture is cooled to 80° C. and 200 parts of ethanol are added. The mixture is allowed to cool and the new dyestuff which cystallizes out is filtered off, washed with ethanol and dried. When dispersed in water the product yields attractive blue shades on acetate rayon of very good fastness to gas fumes and to light.

*Example 10*

5 parts of the dyestuff of Example 8 and 5 parts of the dyestuff of Example 9 are mixed together and added gradually to 100 parts of 70% sulphuric acid which is stirred at 10–15° C. The mixture is stirred for about 15 minutes to dissolve the dyestuff and the acid mixture is then poured into 500 parts of a mixture of ice and water. The precipitated dyestuff is filtered off and washed acid-free and finally milled in the presence of a dispersing agent. The dyestuff mixture thus obtained has very good affinity for acetate rayon which it dyes in attractive blue shades of very good fastness to burnt-gas fumes and to light.

*Example 11*

6 parts of 1:8-dihydroxy-4:5-dinitro anthraquinone, 12 parts of phenol and 12 parts of 5-amino-2-methyl-benzyl β-(β'-hydroxyethoxy)-ethyl ether are stirred together at 125° C. for 16 hours. The dyestuff is isolated in a manner similar to that used in Example 8. It dyes acetate rayon in blue shades possessing very good properties of fastness to burnt-gas fumes.

*Example 12*

8 parts of 1:5-dihydroxy-4:8-dinitro-anthraquinone, 16 parts of phenol and 16 parts of m-aminobenzyl β-methoxyethyl ether are stirred together at 125° C. for 18 hours. After cooling to 50° C. 80 parts of β-ethoxyethanol and 120 parts of ethanol are added and the mixture so obtained is allowed to stand for 12 hours. The solid product which crystallizes out is then filtered off, washed with ethanol and dried to give a dark blue powder which when dispersed in water dyes acetate rayon in attractive blue shades of very good fastness to burnt-gas fumes and to light.

What I claim is:

1. Anthraquinone derivatives having a formula selected from the group consisting of

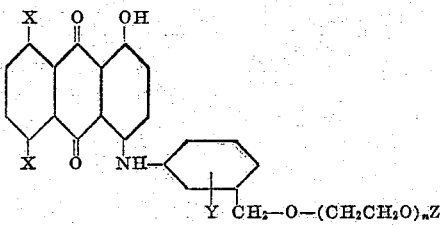

and

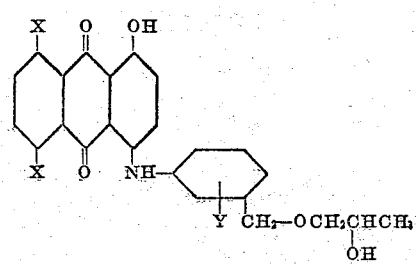

wherein one of the substituents X is hydroxy and the other is nitro; Y is selected from the group consisting of hydrogen and methyl; Z is selected from the group consisting of hydrogen and alkyl radicals and $n$ represents an integer from 1 to 3.

2. A compound of the formula

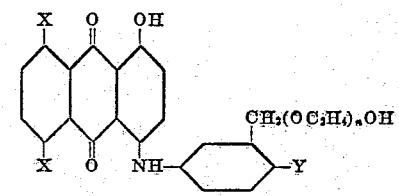

wherein one X stands for $NO_2$ and the other X stands for OH, Y is selected from the group consisting of hydrogen and methyl, and $n$ has a value of 1 to 3.

3. The compound of the formula

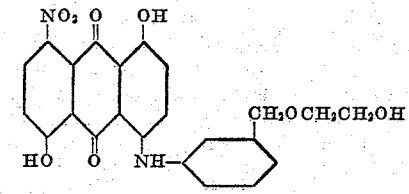

4. The compound of the formula

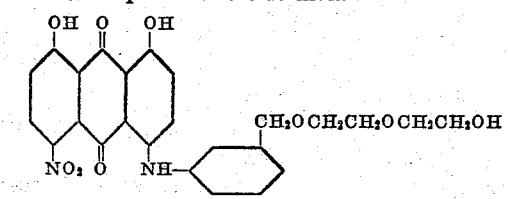

5. The anthraquinone derivative of the following formula:

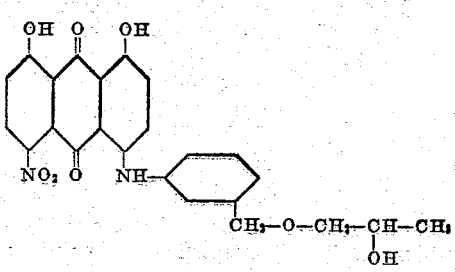

6. The anthraquinone derivative of the following formula:
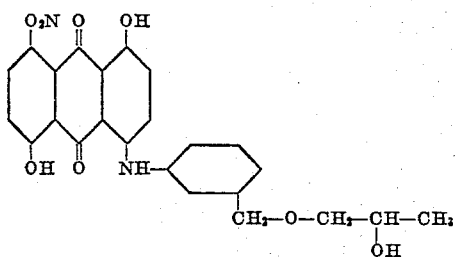
7. The anthraquinone derivative of the following formula:
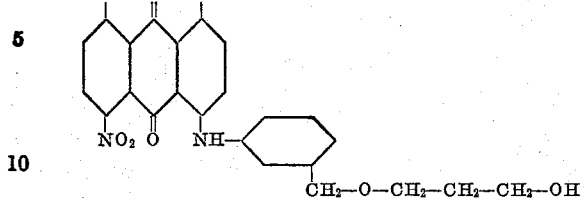
References Cited in the file of this patent
UNITED STATES PATENTS
| | | |
|---|---|---|
| 2,480,269 | Seymour et al. | Aug. 30, 1949 |
| 2,585,681 | Randall et al. | Feb. 12, 1952 |
| 2,641,602 | Straley et al. | June 9, 1953 |
| 2,651,641 | Straley et al. | Sept. 8, 1953 |